A. GOHMANN.
CHAMBER OVEN OF THE REVERSING FLAME TYPE.
APPLICATION FILED JUNE 28, 1913.

1,180,027.

Patented Apr. 18, 1916.
2 SHEETS—SHEET 1.

Witnesses:
Charles Mathé
T. J. Browne.

Inventor:
Arthur Gohmann
by
John Lotka
Attorney

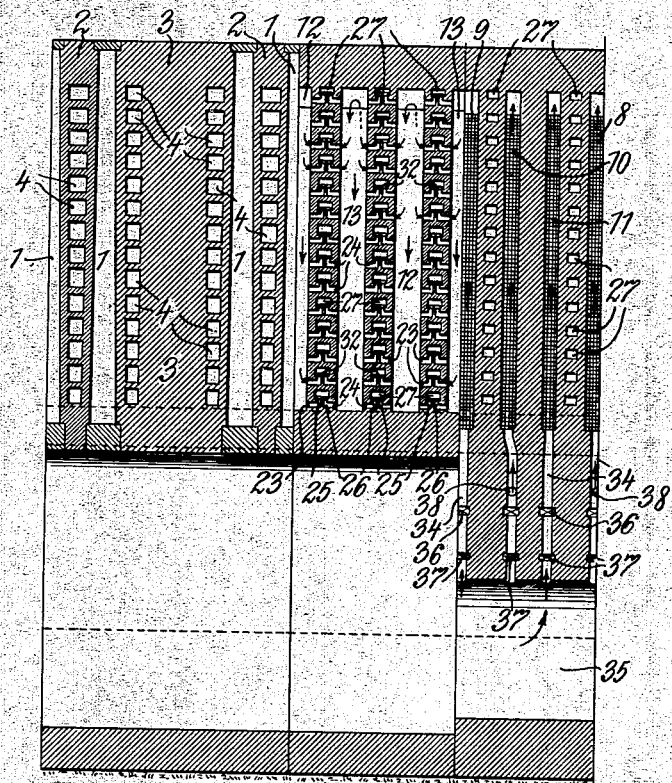

UNITED STATES PATENT OFFICE.

ARTHUR GOHMANN, OF STETTIN, GERMANY, ASSIGNOR TO STETTINER CHAMOTTE-FABRIK ACTIEN-GESELLSCHAFT VORM. DIDIER, OF STETTIN, GERMANY, A CORPORATION OF GERMANY.

CHAMBER-OVEN OF THE REVERSING FLAME TYPE.

1,180,027.  Specification of Letters Patent.  Patented Apr. 18, 1916.

Application filed June 28, 1913. Serial No. 776,208.

*To all whom it may concern:*

Be it known that I, ARTHUR GOHMANN, a subject of the German Emperor, and a resident of Stettin, Germany, have invented certain new and useful Improvements in Chamber-Ovens of the Reversing Flame Type, of which the following is a specification.

My present invention relates to chamber ovens of the reversing flame type, in which regenerators arranged side by side in alternate order, serve to preheat the fuel (gas) and the air respectively.

With an oven of this type it may be desirable in some cases, for instance if the oven is to be used for the production of illuminating gas, to temporarily put one or more chambers out of operation, according to the lessened requirements of consumption, without however affecting the operation of the other chambers. For this purpose, according to the present invention, the oven chambers have been divided into several groups by wide heating walls, and the heating flues of the narrow heating walls separating the individual chambers of each group are connected at each end with two adjoining regenerators of a series of regenerators located between the end regenerators of the group. The wide heating walls situated between the chamber groups have separate heating flues for the end chamber of each group, these flues being in communication at each end only with one end regenerator and with the adjoining intermediate regenerator of the respective group. This arrangement yields a very simple and compact regenerator structure and allows the individual groups of chambers to be put out of operation without interrupting the heating of the other groups of chambers. All that is necessary to put an individual chamber group out of operation, is to shut off the respective regenerators and their fuel-supply conduits.

A typical example of my invention is shown in the accompanying drawings in which—

Figure 1:
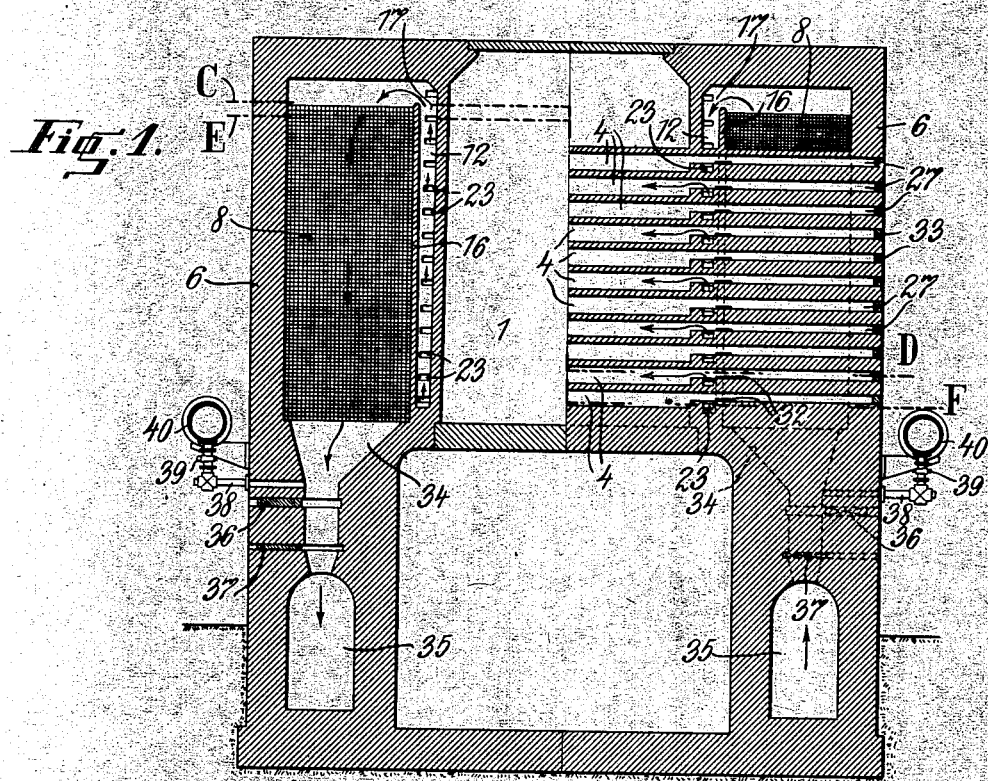
Figure 2:
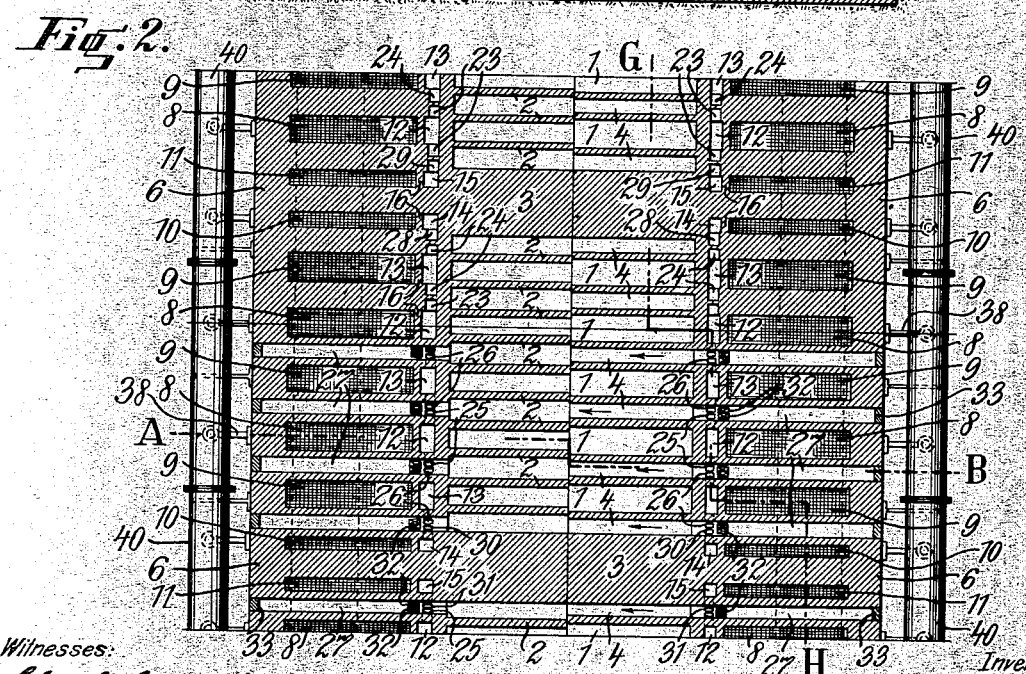

Figure 1 is a cross section of the oven taken on the line A—B of Fig. 2; Fig. 2 is a partial horizontal section, the lower portion being taken on line C—D of Fig. 1, and the upper portion on line E—F of Fig. 1; and Fig. 3 is a partial longitudinal section taken on line G—H of Fig. 2.

The chamber oven shown in the drawings is provided with upright or vertical gasifying chambers 1 arranged side by side in groups each of which comprises five chambers. Between adjoining chambers of the same group I arrange relatively narrow (thin) heating walls 2, while relatively wide (thick) heating walls 3 are arranged between two adjoining groups of chambers.

In each of the thin heating walls 2, I provide a series of superposed longitudinal or horizontal heating flues 4. Each of the thick heating walls 3 contains two series of superposed horizontal heating flues 4, each series being adjacent to one of the adjoining oven chambers 1.

In each of the side walls 6 of the oven a relatively wide upright regenerator 8 or 9 respectively is arranged adjacent to each of the oven chambers 1. At the sides of each heating wall 3, the side walls 6 are provided with pairs of regenerators 10 and 11 respectively, these regenerators being also upright but only half so wide (deep) as the regenerators 8 and 9. These regenerators serve for heating the fuel (gas) and air, the arrangement being alternating, that is to say, for instance the regenerators 8 and 10 will serve to heat the fuel, while the regenerators 9 and 11 will serve to heat the air for supporting combustion.

The wide regenerators 8 and 9 for heating gas and air respectively are connected by openings 17 (provided at the upper ends of the partitions 16) with vertical or upright fuel-distributing channels 12 or with similar air-distributing channels 13 respectively. In a corresponding manner, the narrow gas regenerators 10 and the narrow air regenerators 11 are connected with upright channels 14 and 15 for distributing gas and air respectively. The channels 12, 13, 14, and 15 are arranged at the inner portions of the respective regenerators.

From the distributing channels 12 and 13 two series of short ducts 23 and 24 respectively are branched off, said ducts ranging transversely of the oven chambers, and communicating by means of slits 25 and 26 respectively with channels 27, connected with the upper portions or halves of the heating flues 4 at both ends and leading outwardly therefrom.

From each of the distributing channels 14 and 15 a single series of short ducts 28 and 29 respectively are branched off transversely of the oven chambers. The ducts 28 and 29 are connected by slits 30 and 31 respectively with the channels 27, communicating with both ends of the heating flues 4 located in the wide heating walls 3, the channels 27 connecting with the upper portions or halves of said flues.

The effective cross section of the slits 25, 26, 30, and 31 may be varied or regulated by means of slides or dampers 32 disposed in the channels 27, and adjustable from the outside by means of rods or suitable tools. Normally, the outer ends of the channels 27 are closed by plugs 33, which are removable for the purpose of affording access to the slides 32 when desired.

In the manner described above, each of the gas regenerators 8 communicates, by means of the distributing channels 12 and means of the branch ducts 23, 25, with the heating flues 4 located at both sides of the oven chamber 1 adjacent to said regenerator. Similarly, each of the air regenerators 9 is connected, by means of the distributing chanels 13 and the branch ducts 24, 26, with those heating flues 4 which are located at opposite sides of the oven chamber 1 adjacent to this particular regenerator. The gas regenerators 10 disposed at the end of a group of oven chambers, are however connected by the distributing channels 14 and the branch ducts 28, 30, only with one of the series of heating flues 4 provided in the corresponding wide heating wall 3. In a like manner, the air regenerators 11 disposed at the end of a group of chambers are connected, by the distributing channels 15 and the branch ducts 29, 31 with only one of the series of heating flues 4 provided in the corresponding heating wall 3.

Each of the regenerators 8, 9, 10, 11, whether located at one side of the oven or at the other, is connected at its bottom with a channel 34 adapted to communicate with a smoke flue 35. The flues 35 belonging to the respective halves or sides of the oven lead to a reversing valve of well-known type (not shown in the drawing), so that said flues 35 can be connected alternately with an air-supply channel and with the stack.

In the channels 34 I have arranged horizontally movable regulating slides or dampers 36 and below them horizontally movable shut-off slides or dampers 37, which can be adjusted from the outside by means of suitable tools.

With the channels 34 corresponding to the gas regenerators 8 and 10, gas-supply channels 38 are connected above the regulating slides 36; these gas-supply channels contain shut-off valves 39 and are connected with a gas main 40 located at the side of the oven. The two gas mains 40 may be connected with any suitable source of supply, such as for instance a gas producer.

The chamber oven described above may be used for example to produce illuminating gas and is operated with a periodic reversal of the flame direction.

During one operating period the gas valves at one side of the oven, say at the right-hand side, are open and the slides 37 of the channels 34 connected with the gas regenerators 8 and 10 are closed. At the same time, the gas valves 39 at the left-hand side of the oven are closed and all the slides 37 on that side of the oven are open. The gas supplied through the channels 38 of the right-hand side of the oven travels through the respective regenerators 8 and 10 in which it becomes heated, and this heated gas then passes to the distributing channels 12 and 14, the branch ducts 23 and 28 and the slits 25, 30, thus reaching the heating flues 4. The combustion air supplied to the right-hand side of the oven through the flue 35 passes through the channels 34 into the respective regenerators 9 and 11, in which it becomes heated. The heated air then passes through the distributing channels 13 and 15, the branch ducts 24 and 29, and the slits 26, 31 into the heating flues 4. On the left-hand side of the oven the combustion products or off-gases escape from the heating flues 4 through all of the slits 25, 26, 30 and 31, passing through the branch ducts 23, 24, 28, 29 respectively and through the channels 12, 13, 14, 15 respectively into the regenerators 8, 9, 10 and 11 respectively, of the left-hand side of the oven. In these regenerators the heat of the off-gases is absorbed by the checker work or other filling. After passing through the regenerators, the off-gases travel to the stack through the channels 34 and the flue 35.

At the beginning of the next operating period the gas valves 39 are closed on the right-hand side of the furnace and opened on the left-hand side. Further, the slides 37 belonging to the gas regenerators on the right-hand side of the oven are opened and the corresponding slides 37 of the left-hand side of the oven are closed. The operation will then be similar to that occurring during the first period, with this difference, however, that on the left-hand side of the oven the air and the fuel (gas) will be heated in the respective regenerators, while on the right-hand side of the oven the regenerators will be heated by the off-gases.

In the event of a reduced consumption of the illuminating gas produced by the chamber oven, one or more groups of oven chambers may be put out of operation, without interfering with the operation of the remaining groups of chambers. All that is required to shut off a group of chambers, is to close all the gas valves 39 of said group and the corresponding dampers or slides 37 on both sides of the oven. Since the end regenerators 10 or 11 respectively of the group which has been cut out temporarily are not connected with the heating flues of the adjoining groups, the latter can continue in operation without any interruption. The cutting out of one group or of a plurality of groups does not interfere with the proper heating of the end chambers of the groups remaining in operation, since these groups are separated from the temporarily inoperative group by wide (thick) heating walls 3 and in view of the fact that each end chamber is heated by means of separate heating flues 4 contained in the respective heating wall 3.

Various modifications may be made without departing from the nature of my invention as set forth in the appended claims.

I claim:

1. A chamber oven of the reversing flame type, provided with chambers arranged in groups, relatively wide partitions separating adjoining groups of chambers, relatively narrow partitions separating adjoining chambers of the same group, fuel-heating regenerators located at the sides of said chambers, air-heating regenerators alternating with said fuel-heating regenerators and likewise located at the sides of the oven chambers, said partitions containing heating flues, the flues of the narrow partitions being connected at both ends with two adjoining regenerators of the same group, while the wide partitions intervening between adjacent groups have separate flues for the end chambers of each of said groups, such flues being connected at both ends with one end regenerator and with the adjacent intermediate regenerator of the same group.

2. A chamber oven provided with chambers arranged in groups, relatively wide partitions separating adjacent groups of chambers and provided with two independent series of heating flues, relatively narrow partitions separating adjacent chambers of the same group and containing heating flues, regenerators located adjacent to said chambers, the respective series of heating flues of the wide partitions being connected at both ends with end regenerators of adjoining groups and also with the adjacent intermediate regenerators of the same groups, while the heating flues of the narrow partitions are connected at both ends with two adjoining intermediate regenerators of the same group.

3. A chamber oven provided with chambers arranged in groups, relatively wide partitions separating adjacent groups, relatively narrow partitions separating adjacent chambers of the same group, all of said partitions containing heating flues, and means whereby the heating action may be discontinued in all the chambers of the same group without affecting the operation in chambers of the other groups.

4. A chamber oven provided with chambers arranged in groups each comprising two end chambers and a series of intermediate chambers, relatively narrow partitions containing heating flues and separating adjacent chambers of the same group, relatively wide partitions containing two series of heating flues and separating adjacent groups of chambers, relatively wide regenerators located adjacent to said intermediate chambers and connected with the flues of the narrow partitions, and relatively narrow regenerators located adjacent to the end chambers and connected with the flues of the wide partitions.

5. A chamber oven provided with chambers arranged in groups each comprising two end chambers and a series of intermediate chambers, relatively narrow partitions containing heating flues and separating adjacent chambers of the same group, relatively wide partitions containing two series of heating flues and separating adjacent groups of chambers, relatively wide regenerators located adjacent to said intermediate chambers, the flues of the intermediate narrow partitions being connected at both ends with two adjoining wide regenerators of the same group, and relatively narrow regenerators located adjacent to the end chambers, the respective series of flues of the wide partitions being connected at both ends with the end regenerators of two adjoining groups and with the adjacent intermediate regenerators of the same groups.

6. A chamber oven provided with chambers arranged in groups, relatively wide partitions separating adjacent groups of chambers and provided with two independent series of heating flues, relatively narrow partitions separating adjacent chambers of the same group and containing heating flues, heaters located adjacent to said chambers, the respective series of heating flues of the wide partitions being connected at both ends with end heaters of adjoining groups and also with the adjacent intermediate heaters of the same groups, while the heating flues of the narrow partitions are connected at both ends with two adjoining intermediate heaters of the same group.

7. A chamber oven provided with end walls containing heating flues, and with chambers separated by partitions containing heating flues, each set of heating flues having connections at opposite sides of the oven, heaters located adjacent to both sides of the said chambers, each set of heating flues in said partitions and end walls being connected at one end with two adjoining heaters located at one side of the oven, and at the other end with two adjoining heaters located at the other side of the oven.

8. A chamber oven provided with chambers separated by partitions containing heating flues, each set of heating flues having connections at opposite sides of the oven, heaters located adjacent to both sides of said chambers, each set of flues in said partitions being connected at one end with two adjoining heaters located at one side of the oven, and at the other end with two adjoining heaters located at the other side of the oven.

9. A chamber oven provided with end walls containing heating flues, and with chambers separated by partitions containing heating flues, each set of flues having connections at opposite sides of the oven, regenerators located adjacent to both sides of said chambers, alternate regenerators having connections to receive air and gas respectively, and each set of heating flues in said partitions and end walls being connected at one end with a gas regenerator and an air regenerator located at one side of the oven, and at the other end with a gas regenerator and an air regenerator located at the other side of the oven.

In testimony whereof I have signed this specification in the presence of the subscribing witnesses.

ARTHUR GOHMANN.

Witnesses:
LOUIS VANDORN,
GERTRUDE SCHÄFER.